United States Patent [19]

Pirovano et al.

[11] 4,325,479
[45] Apr. 20, 1982

[54] FEED CONVEYOR

[76] Inventors: Camillo Pirovano, Via Spluga, Cernuscc Lombardone, Como; Umberto Vergani, Via Marconi, 199 - Merate, Como, both of Italy

[21] Appl. No.: 939,214

[22] Filed: Sep. 5, 1978

Related U.S. Application Data

[63] Continuation of Ser. No. 756,435.

[30] Foreign Application Priority Data

Nov. 9, 1976 [IT] Italy .............................. 29172 A/76

[51] Int. Cl.³ .............................................. B65G 19/08
[52] U.S. Cl. ................................... 198/733; 198/834
[58] Field of Search ............... 198/643, 716, 727, 729, 198/730, 733, 734, 831, 834, 835

[56] References Cited

U.S. PATENT DOCUMENTS

| | | | |
|---|---|---|---|
| 1,540,681 | 6/1925 | Detaint | 198/643 |
| 2,326,535 | 8/1943 | Hapman | 198/733 |
| 2,680,511 | 6/1954 | Hapman | 198/733 |
| 3,831,751 | 8/1974 | Pirovano | 198/733 |

*Primary Examiner*—Joseph E. Valenza
*Attorney, Agent, or Firm*—Hubbell, Cohen, Stiefel & Gross

[57] ABSTRACT

A feed conveyor for loose materials of the kind in which a plurality of spaced apart radially protruding scraping flights are integrally molded on a flexible cable, the improvement being characterized by distributing the stress on the cable more evenly throughout the length thereof when the cable assumes a flexed position, resulting in a concomitant decrease in the frequency of cable failure.

3 Claims, 3 Drawing Figures

FEED CONVEYOR

This is a continuation, of application Ser. No. 756,435, filed Jan. 3, 1977 now abandoned.

BACKGROUND OF THE INVENTION

1. Field of the Invention

This invention relates to feed conveyors for conveying loose material. More particularly, this invention relates to feed conveyors wherein a plurality of scraping flights are integrally molded on a flexible cable.

2. Prior Art

Feed conveyors having a plurality of scraping flights integrally molded on a flexible cable are well known. Such feed conveyors are widely used, for example, in systems for conveying granular food to a large number of animals, such systems consisting primarily of a continuous tube, a continuous feed conveyor disposed in the tube for driving the food through the tube, a mechanism for driving the feed conveyor along the tube, and supply and discharge points associated with the tube.

An exemplary system is shown in U.S. Pat. No. 3,831,751, the contents of which are incorporated herein by reference to their entirety. During the course of operation of such systems, the feed conveyors, being driven in a closed loop, necessarily undergo bending as they turn corners, go around pulleys, and the like. Consequently, one of the problems associated with feed conveyors is that due to the stress on the cable occasioned by such constant bending, cable failures frequently occur. Accordingly, it is an object of the present invention to reduce the frequency of occurence of such cable failure.

Other features and advantages will become more clearly apparent from the annexed detailed description and drawings of the preferred embodiment of the feed conveyor of the present invention.

SUMMARY OF THE INVENTION

This invention relates to feed conveyors of the type wherein a plurality of scraping flights are molded on a flexible cable, the flights being so designed that the frequency of occurrence of cable failure will be reduced.

The result is accomplished by utilizing a plurality of scraping flights of the type having both a central portion and a pair of tubular sleeve members, the sleeve members extending axially along the feed cable from either side of the central portion, each of the sleeve members having a support distance associated therewith, the support distance being equal to the length of the sleeve member plus one half the width of the central portion connected thereto. The scraping flights are disposed on the cable such that adjacent sleeve members will have preferably a length of exposed cable therebetween, the flights being so constructed that the sums of the support distances of adjacent sleeve members will be equal or greater than the length of exposed cable therebetween (if any), this construction serving to more evenly distribute the stress on the cable throughout the length of the exposed portion of said cable when the cable assumes a flexed position. Furthermore, the increased flexibility of the tubular members of the scraping flights of the present invention allows the portion of the cable underlying the tubular members to bend when the exposed portions of the cable adjacent thereto are flexed, thereby further distributing the stress on said cable.

DETAILED DESCRIPTION OF THE PREFERRED EMBODIMENTS

Figure 1:
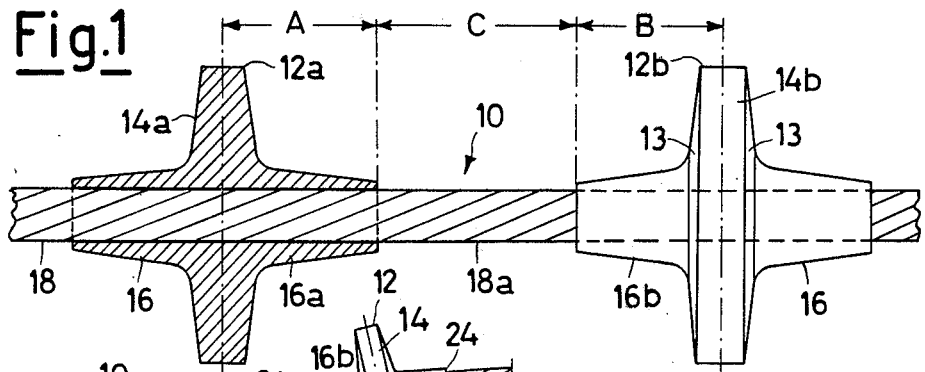
FIG. 1 is a view partly in vertical section and partly in elevation illustrating a portion of a feed conveyor embodying the present invention.

Referring now to the drawings in detail and particularly to FIG. 1 thereof, a feed conveyor embodying the present invention is generally designated by the reference numeral 10. Feed conveyor 10 preferably includes a steel stranded continuous or endless cable 18 and a plurality of scraping flights 12, said scraping flights being fixed to said cable 18 equidistant from each other. Flights 12 are preferably fixed to the cable by being molded thereon.

As shown in FIG. 1, each scraping flight 12 is comprised preferably of a disc-shaped central portion 14 and a pair of preferably frustoconical tubular sleeve members 16, said sleeve members extending axially along the cable 18 from either side of the central portion 14 and being integrally molded therewith. Between each pair of adjacent tubular sleeve numbers 16 is a portion of exposed cable 18a. The scraping flights 12 are preferably formed of a flexible or resilient plastic, preferably polypropylene, although other plastics may be employed. Preferably, all of the flights 12 associated with a single feed conveyor 10 possess identical dimensions.

With reference to FIG. 1, and for reasons that will be more fully explained below, the dimensions of the preferred feed conveyor 10 of the present invention satisfy the equation $A+B \geq C$, where A is the support distance of the tubular member 16a, said distance being equal to the length of the member 16a plus one half the thickness of the central portion 14a, B is the support distance of the tubular sleeve member 16b, said support distance being equal to the length of the tubular sleeve member 16b plus one half the width of the central portion 14b, and C is the length of the exposed cable 18a between the adjacent tubular sleeve members 16a and 16b. As presently preferred and shown in FIG. 1, where all of the flights 12 possess identical dimensions (i.e., A=B), the above equation is readily simplified to $2A \geq C$.

Figure 3:
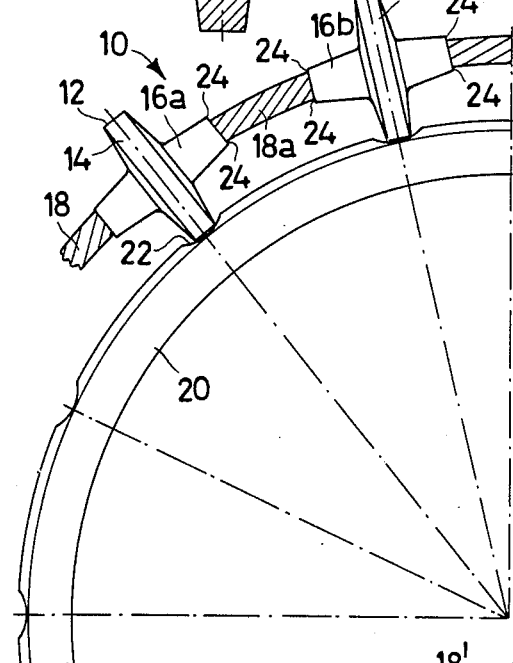
FIG. 3 is a view similar to FIG. 2, but illustrating the operation of the preferred feed conveyor of the present invention.
Figure 2:
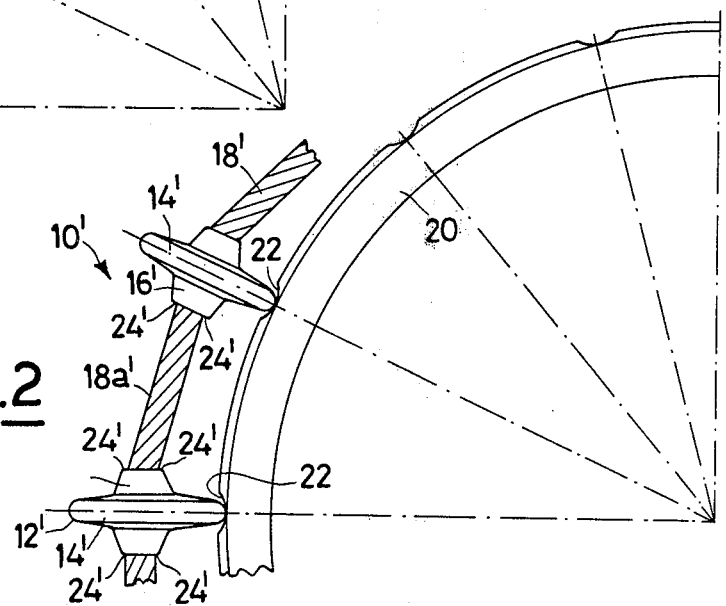
FIG. 2 is an elevational view illustrating the operation of a prior art feed conveyor as it is moved about a drive sprocket.

Referring now to FIGS. 2 and 3, FIGS. 2 and 3, respectively, show a prior art feed conveyor 10' and the feed conveyor 10 of the present invention as they are driven about a circular drive sprocket 20. As shown, the sprocket 20 has a plurality of notches 22, the pitch of the notches 22 being equal to the spacing between the flights 12 (12'). This is more fully described in said U.S. Pat. No. 3,831,751 to which reference may be had.

Referring now to the prior art feed conveyor 10' shown in FIG. 2, feed conveyor 10' comprises a flexible cable 18', generally stranded, and a plurality of spaced apart flights 12', generally molded on cable 18'. Flights 12' differ from flights 12 of the present invention in two important ways. First, sleeve members 16' are very short as compared with sleeve members 16 of the present invention and they are of considerably greater diameter. Both of these differences render sleeve member 16' much more rigid than sleeve member 16. This being the case, as cable 18' extends around a bend, such as sprocket 20, the points of greatest stress on the cable 18' will occur at the points 24', the stress on the cable 18' at these points being very high. Much of cable portion 18' will be unbent (and hence unstressed) while the points 24' will provide all of the needed bend for the pitch length. Thus, the greatest frequency of cable failure is observed at these points 24'.

Referring now to FIG. 3, the feed conveyor 10 of the present invention is shown, wherein the support distances of the adjacent tubular members 16 and the length of exposed cable therebetween satisfy the relationship $A+B \geq C$. Because of the extended length of the support distances of the adjacent tubular sleeve members 16, the reduction in their thickness with a resultant increase in their yieldability or bendability, and the reduced length of the exposed cable 18a therebetween, the degree of curvature at the points 24 is reduced, with the curvature of the cable 18 being more evenly distributed over the entire exposed portion 18a of the cable 18 as well as that portion of cable 18 underlying members 16a and 16b. Consequently, the stress on the cable 18 at the points 24 is reduced, resulting in a concomitant reduction in the frequency of cable failure.

Referring again to FIG. 1, the dimensions of a feed conveyor embodying the present invention are as follows: the diameter of the truncated apex of the frusto-conical member 16 is 6 mm; the diameter of the base of the member 16 is 9.5 mm; the length of the member 16 is 12.75 mm; the width of the central portion 14 of the member 12 is 4.5 mm; the diameter of the central portion 14 is 29.5 mm; the angle of elevation of the side walls 13 of the central portion 12 is 5°; the radius of curvature of the intersection of the base of the member 14 with the side walls 13 is 1.5 mm; the diameter of the cable 18 is 5 mm; and the pitch of the flights 12 is 50.265 mm. These dimensions are illustrative of a group of dimensions which yield the desired result. Clearly, other dimensional groupings may be employed without departing from the spirit and scope of this invention.

While we have herein shown and described the preferred embodiments of the present invention and modifications have been suggested therein, other changes and modifications may be made therein within the scope of the appended claims without departing from the spirit and scope of this invention.

What is claimed is:

1. In a feed conveyor of the type wherein a plurality of radially protruding scraping flights are molded on a flexible feed cable, said flights being equidistant from each other, each flight having both a central portion and a pair of tubular sleeve members, said sleeve members extending axially along said feed cable from both sides of said central portion, each of said tubular sleeve members having a support distance associated therewith equal to the length of that sleeve member plus one half the length of said central portion, said flights being spaced apart a distance sufficient to expose a length of cable between confronting tubular sleeve members on adjacent flights, the improvement comprising:

the sums of the support distances of each pair of confronting sleeve members being greater than the length of exposed cable therebetween, said length of exposed cable being greater than the length of either of said adjacent sleeve members.

2. A feed conveyor according to claim 1, wherein said tubular sleeve members are bendable with said cable whereby to more evenly distribute the stress on said cable by distributing some of the stress on said cable over the portion of said cable underlying said tubular members when said cable is bent.

3. A feed conveyor according to claim 1, wherein the dimensions of each of said scraping flights are substantially the same.

* * * * *